(No Model.)
J. McKENNEY & T. W. McKEEVER.
CANTEEN.
No. 350,544. Patented Oct. 12, 1886.
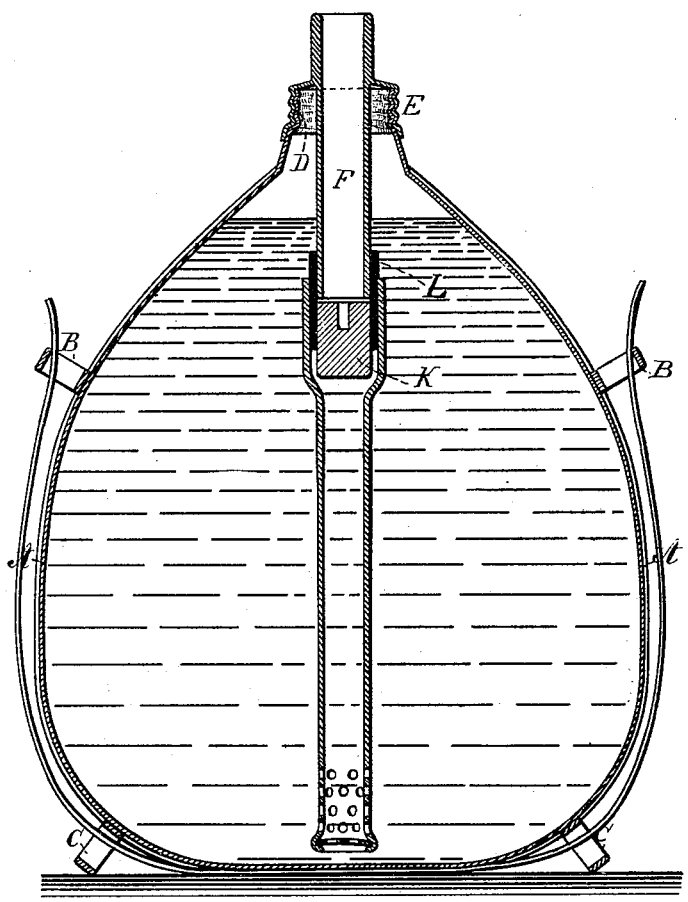
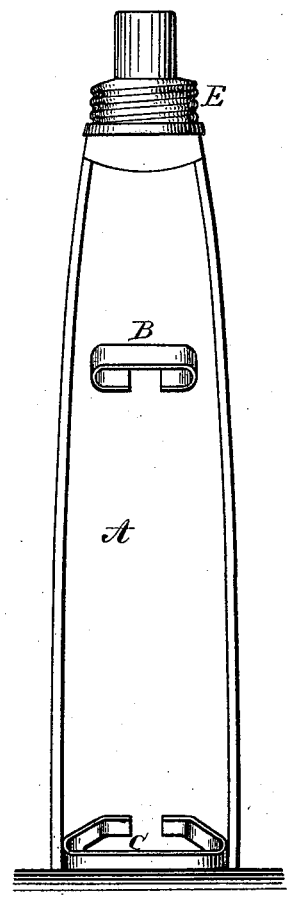
Witnesses:
J. Staib
Chas. H. Smith
Inventors:
James McKenney
Timothy W. McKeever
per Lemuel W. Serrell atty
N. PETERS, Photo-Lithographer, Washington, D. C.

United States Patent Office.

JAMES McKENNEY, OF NEW YORK, AND TIMOTHY W. KcKEEVER, OF BROOKLYN, N. Y.

CANTEEN.

SPECIFICATION forming part of Letters Patent No. 350,544, dated October 12, 1886.

Application filed January 18, 1886. Serial No. 188,831. (No model.)

*To all whom it may concern:*

Be it known that we, JAMES McKENNEY, of the city and State of New York, and TIMOTHY W. McKEEVER, of Brooklyn, in the county of Kings and State of New York, have invented an Improvement in Canteens, of which the following is a specification.

Tubes have been inserted through the cork of the canteen; but this is subject to the risk of loss, and the tube acts to loosen the cork as the canteen moves.

In canteens for soldiers and others it is desirable to prevent the liquid spilling when the canteen is carelessly or rapidly used; also to provide for removing the filtering material with facility for cleaning the same, and for replacing the same tightly within the suction-tube; also to prevent the canteen falling over when stood upon a table or the ground. These objects we accomplish by providing a screw-cap for the canteen and a two-part vertical suction-tube passing through and permanently fastened to the screw-cap, and a filter within the suction-tube surrounded by a rubber-tube that also renders the two parts of the suction-tube water-tight, and loops at the lower portion of the canteen forming supporting-feet. The suction-tube is open at both ends, the lower end being near the bottom of the canteen at the inside thereof, so that water cannot run out even when the canteen is inverted, but when a drink is to be taken the water is drawn up through the tube by the mouth applied to the upper end, and the filter prevents any impurities from being drawn up by the water.

In the drawings, Figure 1 is a vertical section of the canteen, and Fig. 2 is an edge view of the same.

The vessel A is of any desired size or shape. Usually it is flat on its sides and of a heart-shaped outline. There are loops B by which the vessel is suspended by a strap passing through the loops, and it is preferable to make use of loops C at the lower part of the canteen, which also form legs or supports, upon which the canteen will stand firmly when upon a table or other support. At the upper or contracted end of the canteen is a screw-neck, D, upon which a removable screw-cap, E, is placed, and through this cap E passes the suction-tube F, the same being soldered to the cap and extending down into the canteen. The upper end of this suction-tube is open, and it extends above the cap sufficiently for it to be entered into the mouth, and the lower end of the suction-tube is either entirely open or it is perforated to form a strainer.

The cap and suction-tube can be easily removed for filling the canteen, and when the suction-tube and cap are replaced the contents of the canteen are retained, so that they are not liable to be spilled, and a small draught of water can be taken through the suction-tube without tipping the canteen. If the cover of the canteen closes air-tight only a small quantity of water can be drawn at once, which is a great advantage for economizing the use of water.

Within the suction-tube is a piece of porous filtering material, as at K, for retaining any impurities and preventing them being drawn up by the water.

We make the suction tube in two parts, and surround the filter with a rubber tube, L, that projects beyond the end of the filter and will pass over one section of the suction tube, and over which rubber the other section of the suction tube can be forced, so as to hold the parts in place and make a tight joint.

There may be a slip cap to cover the top of the suction-tube to exclude dust or foreign substances, and any suitable case or cover may be used as with ordinary canteens.

We claim as our invention—

The combination, with the canteen having a screw-neck, of a screw-cap, and a tube passing through the screw-cap and soldered thereto, a filter and case, and a rubber tube between the filter and the case and around the suction-tube, substantially as specified.

Signed by us this 7th day of January, A. D. 1886.

JAMES McKENNEY.
TIMOTHY W. McKEEVER.

Witnesses:
GEO. T. PINCKNEY,
WALLACE L. SERRELL.